A. J. BOYLE.
SEWER PIPE.
APPLICATION FILED MAY 12, 1915.
1,158,416.                                   Patented Oct. 26, 1915.
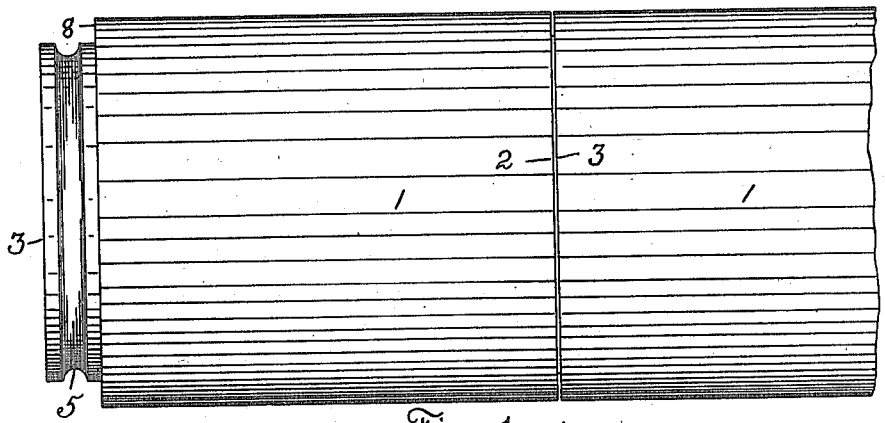
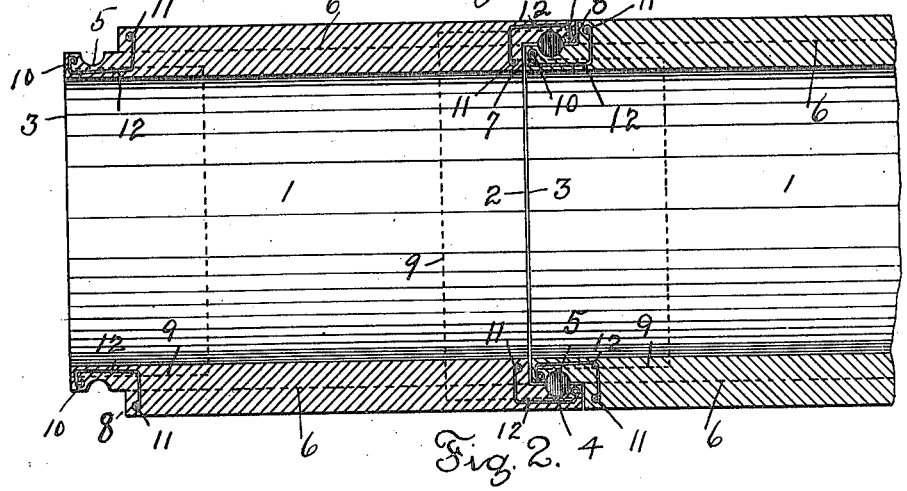

UNITED STATES PATENT OFFICE.

ALBERT J. BOYLE, OF BALTIMORE, MARYLAND.

SEWER-PIPE.

1,158,416. Specification of Letters Patent. Patented Oct. 26, 1915.

Application filed May 12, 1915. Serial No. 27,680.

*To all whom it may concern:*

Be it known that I, ALBERT J. BOYLE, a citizen of the United States, residing at Baltimore, in the State of Maryland, have invented certain new and useful Improvements in Sewer-Pipes, of which the following is a specification.

This invention relates to improvements in reinforced concrete sewer pipe sections for use in constructing sewers, or other conduits, and has for its object to provide a pipe, or section, with a bell end and a spigot end, the latter being adapted to fit within the former, their inner and outer surfaces being flush when fitted together, and each section having a groove therein which coincides with each other when the pipes, or sections, are fitted together, whereby when the pipes or sections are assembled the joints may be filled with concrete, cement, or any other suitable filler, without the use of bands or similar devices to prevent the filling material from running out of said joints, thus forming a sealed lock joint between the pipes or sections.

A further object of the invention is to provide an additional reinforcement for the ends of the pipes or sections adjacent the annular groove therein.

The invention consists of the novel construction and arrangement of the parts and combination of parts hereinafter more fully set forth in the following specification and pointed out in detail in the appended claims.

In the accompanying drawings,—Figure 1 is a side elevation of two pipes, or sections, fitted together, and embodying my invention. Fig. 2 is a vertical longitudinal section of Fig. 1. Fig. 3 is an end view of Fig. 1.

Referring to the accompanying drawings, forming part of this specification, and in which like reference numerals designate like parts through the several views thereof, 1 designates a pipe or section, having a bell end 2 and a spigot end 3, provided with annular segment-shaped grooves 4 and 5, respectively, which coincide and form an annular recess for the binding material when the spigot end of one section is fitted within the bell end of the adjoining section. The annular grooves 4 and 5 being located midway between the outer ends and the shoulders of the bell and spigot ends respectively.

Each pipe or section is provided with a reinforcing material 6 extending entirely around the pipe in the center thereof between and on a line with the shoulders 7 and 8 of the bell and spigot ends, respectively, and a short piece of reinforcing material 9 extending from the outer ends of the bell and spigot ends, back beyond said shoulders 7 and 8 and overlapping the ends of the reinforcing material 6. The bell end 2 is provided with an annular wire 10 between its outer end and the annular groove 4 and an annular wire 11 just back of the shoulder 7, and the spigot end 3 is also provided with an annular wire 10 between its outer end and the annular groove 5 and an annular wire 11 just back of the shoulder 8. The bell end and the spigot end of the sections are each provided with a number of reinforcing rods 12 each of which has one end secured to the annular wire 10 and passes up through said pieces 9 and then down through said pieces 9 and 6 and has its other end secured to the annular wire 11. It will be seen that these rods 12 greatly reinforce the sections adjacent the annular grooves in the ends thereof.

I have discovered by actual test that where the reinforcing element simply extends lengthwise of the pipe sections into the overlapping joint, that the reinforcement at the joint when subjected to a weight of 17,860 pounds pulled apart causing the pipe to break. I then tested in a similar manner two lengths of pipe made according to this specification and the L-shaped reinforcement stood a load of 22,676 pounds, fracture occurring in the body of the pipe and not at the joint.

When the pipes, or sections, are fitted together a piece may be broken off the bell end large enough to permit of the cement, concrete, or other filling material being poured into the grooves 4 and 5 until the latter are filled as well as the portion broken off the bell end, whereby a locked and sealed joint will be formed between the said pipes or sections, the ends and surfaces between said sections fitting close enough together to prevent the filling material from running out through the joints of the sections, thus avoiding the use of bands, or similar devices, on the inside of the pipes when the joints are being filled.

It will be seen that the outer surfaces of the sections are flush when assembled, thus dispensing with the usual enlarged bell end.

Having thus described my invention what I claim is:

1. In a device of the class described having a spigot end and a bell end each forming a shoulder with the main body of the pipe, an annular rod embedded in said shoulders, an annular rod embedded in the extremity of the spigot end and the bell end, and short length wires bent into L shape positively connecting the rod in the shoulder with the rod in the adjacent end.

2. In a device of the class described, having a spigot end and a bell end each forming a shoulder with the main body of the pipe and the spigot end of one pipe adapted to fit into the bell end of another, and be locked therein, an annular rod embedded in said shoulders, an annular rod embedded in the extremity of the spigot end and the bell end, and short length wires bent into L shape positively connecting the rods in the shoulders with the rod in the adjacent ends whereby the wires in the bell end are inverted and coöperate with the wires in the spigot end to inclose and protect the locked adjacent ends of two pipes.

In testimony whereof I affix my signature in presence of two witnesses.

ALBERT J. BOYLE.

Witnesses:
CHAPIN A. FERGUSON,
MAUDE M. AMOSS.